United States Patent
Koshal et al.

(10) Patent No.: US 11,297,032 B2
(45) Date of Patent: Apr. 5, 2022

(54) METHOD FOR DETECTING USER MIGRATION FROM ENTERPRISE NETWORK TO NON-ENTERPRISE NETWORK AND A DEVICE THEREOF

(71) Applicant: COLORTOKENS, INC., Santa Clara, CA (US)

(72) Inventors: Arun Koshal, Khurja (IN); Vishal Sharma, Ghaziabad (IN); Raghavendra Thantradi Nagappa, Bangalore (IN); Sagar Singha, Bangalore (IN)

(73) Assignee: COLORTOKENS, INC., Santa Clara, CA (US)

( * ) Notice: Subject to any disclaimer, the term of this patent is extended or adjusted under 35 U.S.C. 154(b) by 0 days.

(21) Appl. No.: 16/270,602

(22) Filed: Feb. 8, 2019

(65) Prior Publication Data
US 2020/0259780 A1   Aug. 13, 2020

(51) Int. Cl.
H04L 29/12       (2006.01)
G06F 16/953     (2019.01)
H04L 29/06       (2006.01)
H04L 61/4511   (2022.01)

(52) U.S. Cl.
CPC ........ *H04L 61/1511* (2013.01); *G06F 16/953* (2019.01); *H04L 63/0272* (2013.01)

(58) Field of Classification Search
CPC ............. H04L 61/1511; H04L 63/0272; H04L 61/3045; G06F 16/953
See application file for complete search history.

(56) References Cited

U.S. PATENT DOCUMENTS

| | | | |
|---|---|---|---|
| 10,581,803 B1 * | 3/2020 | Chang | H04L 63/166 |
| 2006/0039352 A1 * | 2/2006 | Karstens | H04L 29/12066 370/352 |
| 2009/0222584 A1 * | 9/2009 | Josefsberg | H04L 29/12066 709/245 |
| 2012/0124413 A1 * | 5/2012 | Bauer | H04Q 3/0062 714/4.11 |
| 2013/0198409 A1 * | 8/2013 | Holliday | H04L 67/1014 709/238 |
| 2016/0119276 A1 * | 4/2016 | Pandya | H04L 29/12066 709/223 |
| 2016/0337310 A1 * | 11/2016 | Faccin | H04W 48/17 |

* cited by examiner

*Primary Examiner* — Ario Etienne
*Assistant Examiner* — Kamal Hossain
(74) *Attorney, Agent, or Firm* — Barry Choobin; Patent 360LLC (57) ABSTRACT

Disclosed herein are a method, a device, and a non-transitory computer readable medium for detecting user migration from an enterprise network to a non-enterprise network by using DNS probing. The method includes detecting at least one of a change in state of network connection and change in operational state of a user migration computing device. A domain name system (DNS) query is generated in response to detecting the at least one of a change in state of network connection and change in operational state of a user migration computing device. Further, the DNS query is sent to at least one of a plurality of DNS servers. If an expected DNS response is received, it is determined that the user migration computing device is in the enterprise network. If expected DNS response is not received, that the user migration computing device is outside the enterprise network.

12 Claims, 5 Drawing Sheets

METHOD FOR DETECTING USER MIGRATION FROM ENTERPRISE NETWORK TO NON-ENTERPRISE NETWORK AND A DEVICE THEREOF

FIELD OF THE INVENTION

The present invention relates generally to user migration from enterprise network to a non-enterprise network and vice-versa. In particular, the present invention relates to a method and a device for detecting user migration from enterprise network to a non-enterprise network and vice-versa using domain name system (DNS) probing.

BACKGROUND OF THE INVENTION

Enterprise user moves from enterprise network to home and tries to access office resources. Auto detection of non-enterprise network helps to establish secure remote channel to access the enterprise network.

When the user is within the enterprise network, he can directly access the enterprise application servers. However, when the user moves out and is not part of enterprise network, he cannot continue to access the enterprise application servers seamlessly.

Optimized remote access solution requires detection of non-enterprise network. There are several key problems associated with current approach Detection of enterprise network based on IP address is error prone. Further, windows supports enterprise network detection for domain joined machines and this facility is not present for non-domain user.

Furthermore, remote connection with "Always Connect" property enabled tries to connect with the enterprise network even if user-computing device is within the enterprise network. No mechanism is present in remote access clients to detect non-enterprise network. Problem is compounded by the fact that non-enterprise network detection is done manually.

In order to have user seamlessly access office applications servers from remote network, there exists need for a reliable mechanism to detect a change in the enterprise network. This will ensure that on moving out of the enterprise network, a secure tunnel can be automatically triggered so that the user can transparently continue to access the enterprise application servers. The logic to detect whether user is part of enterprise network or non-enterprise network works by checking the reachability of the enterprise DNS server whenever there is any change in the network address assigned to the user-computing device Further, it would be desirable to have a mechanism that avoids creation of remote connection even within the enterprise network

SUMMARY OF THE INVENTION

Disclosed herein is a method for detecting user migration from an enterprise network to a non-enterprise network. The method includes detecting at least one of a change in state of network connection and change in operational state of a user migration computing device; generating, by the user migration computing device, a domain name system (DNS) query in response to detecting the at least one of a change in state of network connection and change in operational state of a user migration computing device; transmitting, by the user migration computing device, the DNS query to at least one of a plurality of DNS servers resident in the enterprise network; determining, that the user migration computing device is in the enterprise network if an expected DNS response is received; and determining, that the user migration computing device is outside the enterprise network if expected DNS response is not received.

In an aspect of the present invention, a user migration computing device is disclosed. The user migration computing device includes one or more hardware processors and a memory. The memory stores instructions that when executed by the one or more hardware processors cause the one or more hardware processors to perform operations. The operations include detecting at least one of a change in state of network connection and change in operational state of a user migration computing device; generating a domain name system (DNS) query in response to detecting the at least one of a change in state of network connection and change in operational state of a user migration computing device; transmitting the DNS query to at least one of a plurality of DNS servers resident in the enterprise network; determining that the user migration computing device is in the enterprise network if an expected DNS response is received; and determining, that the user migration computing device is outside the enterprise network if expected DNS response is not received.

In another aspect of the present invention, a non-transitory computer readable medium is disclosed. The non-transitory computer readable medium stores instructions, that when executed by a computing device, cause the computing device to perform operations. The operations include detecting at least one of a change in state of network connection and change in operational state of a user migration computing device; generating a domain name system (DNS) query in response to detecting the at least one of a change in state of network connection and change in operational state of a user migration computing device; transmitting the DNS query to at least one of a plurality of DNS servers resident in the enterprise network; determining that the user migration computing device is in the enterprise network if an expected DNS response is received; and determining, that the user migration computing device is outside the enterprise network if expected DNS response is not received.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of techniques of for detecting user migration from an enterprise network to a non-enterprise network and vice-versa by using DNS probing are described herein.

In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
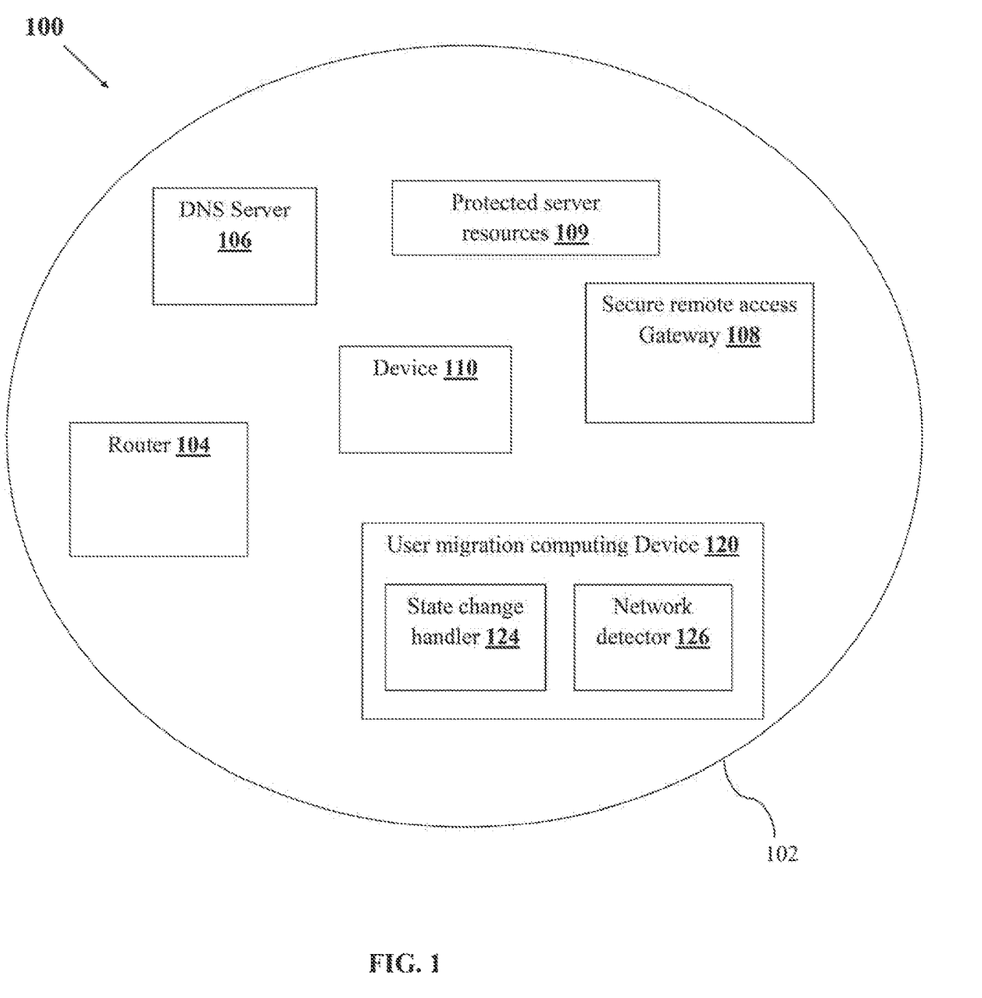
FIG. 1 illustrates an exemplary system implementing a DNS-based determining whether a user migration computing device is inside an enterprise network in accordance with one or more embodiments of the present invention.

FIG. 1 illustrates an exemplary system 100 implementing the DNS-based determining whether a user device is inside a network in accordance with one or more embodiments. System 100 includes a network 102, wherein one or more devices are coupled together via a communication network. The communication network can include wired and/or wireless communications, and allows various devices in the enterprise network 102 to communicate with each other in the enterprise network 102. The enterprise network 102 can be, for example, a local area network (LAN), or proprietary networks, combinations thereof, and so forth.

The enterprise network 102 includes various devices, including one or more routers 104, a DNS server 106, one or more secure remote access gateways 108, one or more other devices 110, and protected server resources 109. These protected server resources 109 may include enterprise server that contain critical information and need to be protected from unauthorized access. These protected server resources 109 never move out of the enterprise network 102.

Routers 104 route data packets or other information among the various devices of enterprise network 102. DNS sever 106 resolves names to network addresses, as discussed in more detail below. The secure remote access gateways 108 manage connecting network 102 to other networks (e.g., the Internet) or other devices outside the enterprise network 102. Communications from devices inside network 102 to devices outside the enterprise network 102, as well as communications from devices outside network 102 to devices inside the enterprise network 102, are managed by the secure remote access gateways 108. The secure remote access gateways 108 provide enterprise resource access to remote user devices (outside the enterprise network 102 after authenticating user. Devices 110 can be a variety of different types of devices, including computing devices such as a desktop computer, a server computer, or a laptop Further, in an exemplary embodiment of the present invention, the enterprise network 102 includes a user migration computing device 120. The user migration computing device 120 includes state change handler 124 and a network detector 126. Further, the user migration computing device 120 includes a Virtual private network (VPN) client to access enterprise resources using VPN connection with the secure remote access gateways 108 when the user is outside the enterprise network 102.

State change handler 124 may be a component present in the user migration computing device 120 to handle change in state of network connection and the user migration computing device 120 operational state (Sleep, Reboot, Shutdown)

State change handler 124 is based on events. Whenever there is any change in state of operation of system registered, handler will be called. Since it is based on event driver, CPU utilization will be lesser as compared to polling based.

Polling based detection will be triggered at regular interval and it will continue to verify irrespective of enterprise network 102 or outside of enterprise network 102, which involves CPU usage at regular interval. But in case of event based trigger, detection will be triggered only if any event arrived, this leads CPU usage only in case of event arrival. Hence, CPU utilization will be less in case of event driven as compared with polling method.

Whenever user travels from enterprise network 102 to non-enterprise network or vice versa, a change of state is expected. For example user moves to neighboring company from the enterprise network 102, there will be change in network, user goes to home by putting laptop to sleep and start laptop after reaching home there will be change of operation state. Migration of user is detected based on system operational state changes.

Further, a network detector may 126 may be a component present in the user migration computing device 120 that detects the enterprise network 102 and non-enterprise network by communicating with the DNS server 106.

The user migration computing device 120 is a device which is used to access protected server resources 109 and are always moving in and out of the enterprise network 102. The user migration computing device 120 may be a mobile computing device that can be easily moved to different locations inside enterprise network 102, as well as outside the enterprise network 102, such as a cellular or other wireless phone, a laptop or notepad computer, and so forth. The user migration computing device 120 is further categorized into two categories:

a. User Local Devices—The user migration computing devices 120 which are present inside the enterprise network 102.

b. User Remote Devices—The user migration computing devices 120 which are not present inside the enterprise network 102 and accesses the enterprise network 102 through the VPN.

Although a single user migration computing device 120 is illustrated in the system 100, it should be noted that multiple user migration computing devices 120 of same or different types of devices can be included in the enterprise network 102.

A device, such as user migration computing device 120, can be referred to as being inside the enterprise network 102 or outside the enterprise network 102. The user migration computing device 120 that is inside (also referred to as internal to) the enterprise network 102 is a device that is included in the enterprise network and thus is able to communicate with other devices included in that network without having to access devices outside that network. Thus, for example, router 104, secure remote access gateway 108, device 112, and the DNS server 106 in the system 100 are inside the enterprise network 102 and are configured to communicate with one another via the communication network of the enterprise network 102 without accessing devices outside the enterprise network 102. Devices inside the enterprise network 102 can communicate with other devices that are not inside the enterprise network 102 by way of the secure remote access gateway 108. It should also be noted that although devices inside the enterprise network 102 can communicate with one another via the enterprise network 102, various access control restrictions based on which (or the manner in which) devices inside the enterprise network 102 can access which other devices inside the enterprise network 102 can be implemented.

Furthermore, devices inside the enterprise network 102 submit DNS queries to, and receive DNS responses from the DNS server 106. A device outside the enterprise network 102 is unable to access the DNS server 106. The DNS queries sent by devices outside the enterprise network 102 will not even reach secure remote access gateway 108.

Figure 2:
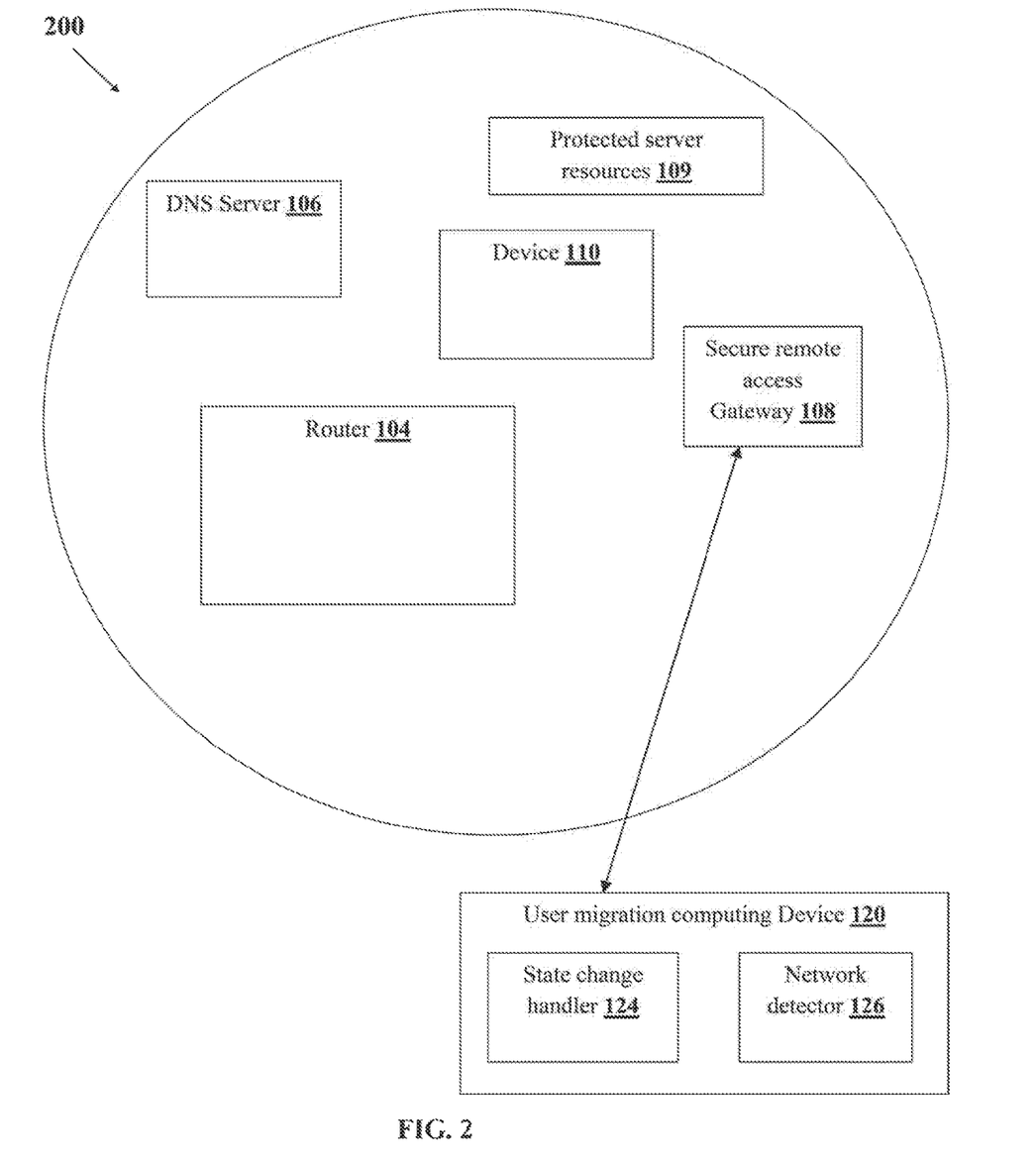
FIG. 2 illustrates another exemplary system implementing the DNS-based determining whether a user migration computing device is inside or outside the enterprise network in accordance with one or more embodiments of the present invention.

In the exemplary system 100, the user migration computing device 120 is shown inside the enterprise network 102. However, situations can arise in which the user migration computing device 120 is outside the enterprise network 102. For example, the user migration computing device 120 can be moved to a different location at which computing device 120 is unable to establish a communication link with network. It should be noted that, throughout its use, the user migration computing device 120 can be moved between being inside the enterprise network 102 and outside network 102 numerous times FIG. 2 illustrates another exemplary system 200 implementing the DNS-based determining whether a device is inside or outside the enterprise network 102 in accordance with one or more embodiments of the present invention. System 200 is similar to system 100 of FIG. 1, including network 102, one or more routers 104, DNS server 106, one or more secure remote access gateways 108. System 200 also includes user migration computing device 120. Although a single user migration-computing device 120 is illustrated in system 200, it should be noted that multiple user migration-computing devices 120 of the same or different types of devices can be included in system 200.

The user migration computing device 120 of FIG. 2 is user migration computing device 120 of FIG. 1. In FIG. 1, the user migration computing device 120 is included inside the enterprise network 102. However, in FIG. 2, the user migration computing device 120 is outside the enterprise network 102 and establishes a communication link with the enterprise network 102 via one or more secure remote access gateways 108. A communication link can be established between user migration computing device 120 and one or more secure remote access gateways 108 via a variety of other devices or communication networks, such as via the Internet, via a cellular or other public network, and so forth.

As described earlier, while referring to FIG. 1, the user migration computing device 120 comprises the state change handler 124 and the network detector 126. The state change handler 124 may be a component present in the user migration computing device 120 to handle change in state of network connection and the user migration computing device 120 operational state (Sleep, Reboot, Shutdown).

Further, a network detector 126 may be a component present in the user migration-computing device 120 that detects enterprise network (102) and non-enterprise network by communicating with the DNS server 106.

The network detector 126 may initiate detecting enterprise network 102 and non-enterprise network in response to change in state of network connection and the user migration computing device 120 operational state (Sleep, Reboot, Shutdown). The change in state of network connection may include the change in the network address assigned to the user migration computing device 120 while moving inside and outside of the enterprise network 102.

The user migration computing device 120 includes network detector 126, which determines whether user migration computing device 120 is inside the enterprise network 102 or outside the enterprise network 102 at any particular time. To perform this determination, network detector 126 leverages a DNS system and DNS servers 106. A DNS system allows devices or services to be identified using a domain name (e.g., included in a Uniform Resource Locator (URL)) that is typically more easily used and referred to by users than network addresses (such as Internet Protocol (IP) v4 or v6 addresses). One or more DNS server 106 operate to map a particular name, such as a domain name, to a corresponding network address that can be used by the user migration computing device 120 to access a particular device or service. This mapping of a name to a corresponding network address is also referred to as DNS resolution.

The network detector 126 may initiate detecting enterprise network 102 and non-enterprise network in response to change in state of network connection and the user migration computing device 120 operational state (Sleep, Reboot, Shutdown).

Generally, network detector 126 determines whether the user migration computing device 120 is inside the enterprise network 102 or outside the enterprise network 102 by sending a DNS query to a DNS server 106. This DNS query is a request to resolve a particular name (e.g., domain name or other name). If the user migration computing device 120 is inside the enterprise network 102 then the DNS query is routed to DNS server 106 and a DNS response is returned to the network detector 126. As mentioned earlier, if the user migration computing device 120 is outside the enterprise network 102, then the DNS query may not be able to reach DNS server 106.

The network detector 126 uses the DNS response (or lack thereof) to determine whether user migration computing device 120 is inside the enterprise network 102. If user migration computing device 120 is inside the enterprise network 102, then the DNS response will include the expected value to which the particular name in the DNS query is mapped and network detector 126 knows the expected value to which the particular name in the DNS query should be mapped, and this is also referred to as the expected value (the value expected by network detector 126 to be included in the DNS response). By way of an example, the expected value may include the network IP addresses assigned to the domain name used in the DNS query.

In view of the above, the method of detecting user's movement between the enterprise network 102 and remote network is a two-step process—detecting the network change or operational state change is just the first step.

It should be noted that detection of user's movement between the enterprise network 102 and some remote network cannot be done only on the basis of network change because corporate/enterprise itself can have multiple networks, user moving from one enterprise network to other will still be part of the corporate/enterprise local network.

There are other ways of detecting user movement—for example—Microsoft Windows does that but the user's machine/user device needs to be part of the enterprise domain in order to detect the movement from the enterprise network 102 to remote network.

As mentioned above the method detecting user's movement between the enterprise network 102 and remote network is a two-step process as explained below:

The first step of the process is a detect network change or change in the operation state of the machine/user device. Therefore, if a user is moving out of the enterprise network 102 and connecting from, let's say, a coffee shop, the network address of the user's device will change. Such a change is the first step, which actually triggers the second step of the method.

The second step is to check the reach ability with a pre-configured enterprise DNS server. A DNS query is sent to get address record for a pre-configured domain. If this DNS query times out and user's device does not get a response, then only it is concluded that user is connected to a remote network. However, if a DNS response is received (positive or negative), user's device is considered to be connected to the enterprise network 102. It should be noted that only after completion of the two steps mentioned above, it is decided that the user's device is connected to a local or remote network.

Further, it is pertinent to note that the method described above is platform agnostic and reliable.

In an exemplary embodiment, user configures list of enterprise domains, secure remote access gateways 108, and DNS server 106.

This configuration is downloaded and stored in the user migration computing device 120 automatically. User may also configure which all protected server resources 109 may be allowed access from the user migration computing device 120. Some of the user migration computing device 120 may move out of the enterprise network 102.

The state change handler 124 registers with operating system (OS) for notification of change in network condition. It also registers for operational state of user migration computing device 120. Once the user migration computing device 120 moves outlin of the enterprise network 102, state change handler 124 receives notification from the OS and it initiates Network Detector 126 to check for presence of the enterprise network 102.

Network Detector 126 selects the domain name from the configured domain lists. Below are steps for domain name selection Domain name selection priority is given to first fully qualified domain name (FQDN) present in the domain list.

If no FQDN is present, then first wildcard entry in the list considered and selects postfix present in the domain.

In remotely accessible domain list configuration, there will be two types of entries, FQDN and wildcard domain name (starts with "*." or "."). To send DNS query, it is first checked for FQDN (it will internal resource FQDN. e.g., host1.ctoken.local) in list, if not found any, then check for first wildcard domain name and remove "." or "*." from it and keep only postfix entry of it (e.g., "*.ctoken.local" is entered as domain name, in this case for DNS query "ctoken.local" is selected).

Once domain name is selected, the user migration computing device 120 selects the first configured DNS server in the configuration, frame and send DNS query to the DNS server 106. If no response is received, then it tries with next configured DNS server. If no response is received again from any DNS server 106, then it considers network is in non-enterprise network and initiates the process of VPN connection. If any response comes then network is considered as the enterprise network. VPN connection and disconnection are handled by VPN client present in user device.

Figure 3A:
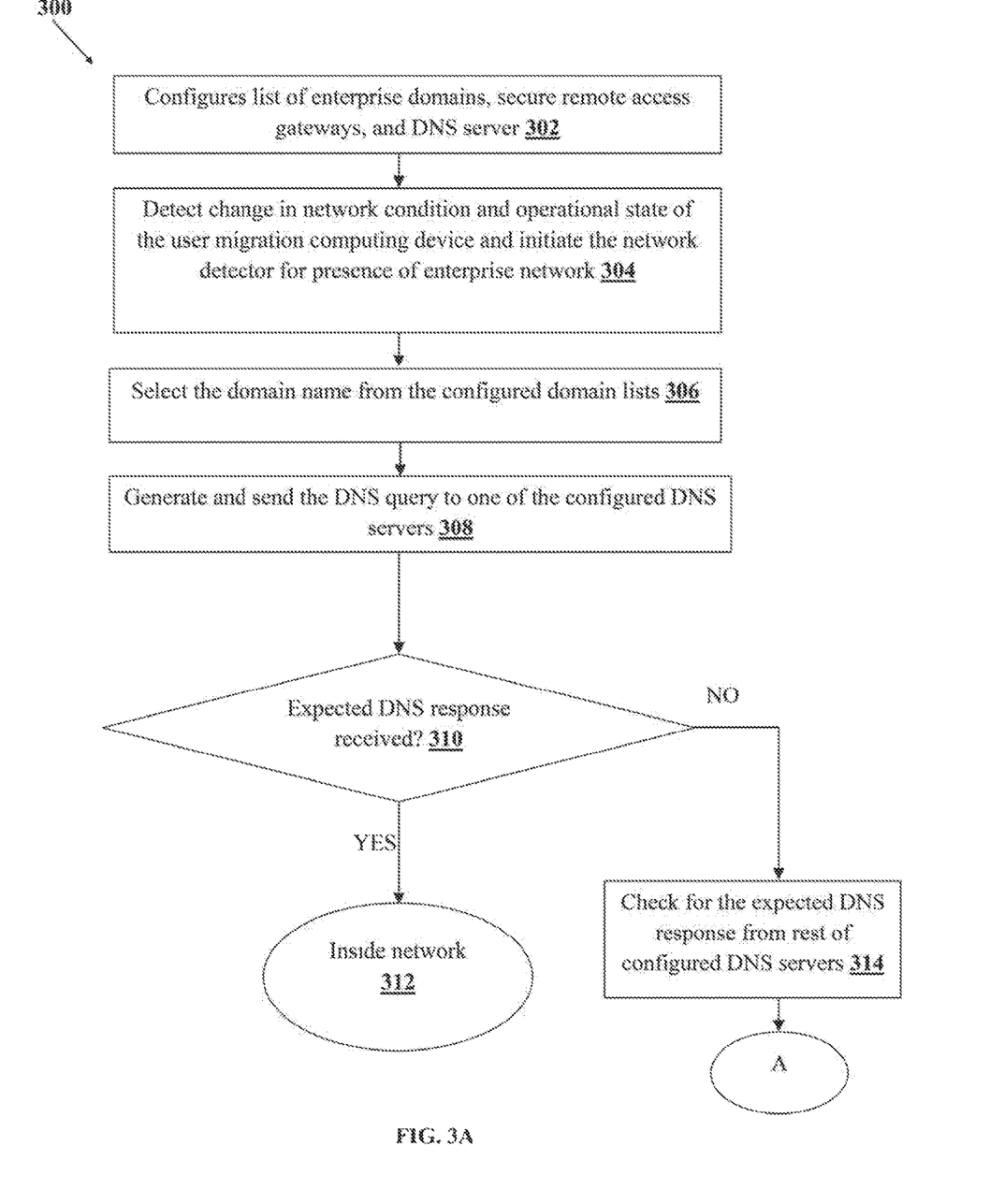
FIGS. 3A-3B is a flowchart illustrating method for detecting user migration from enterprise network to non-enterprise network in accordance with some embodiments of the present invention.
Figure 3B:
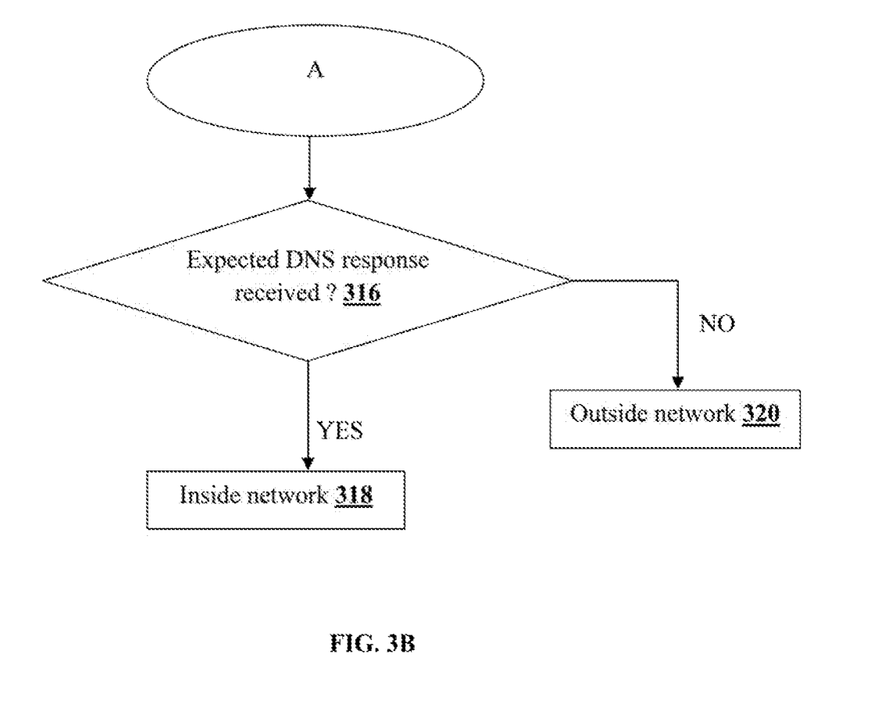

FIG. 3 is flowchart 300 illustrating method for detecting user migration from enterprise network to a non-enterprise network and vice-versa using domain name system(DNS) probing, according to one embodiment.

At step 302, user configures list of enterprise domains, secure remote access gateways 108, and DNS server 106.

Configuration is followed by downloading and storing the configuration list in the user migration computing device 120 automatically. User may also configure which all protected server resources 109 may be allowed access from the user migration computing device 120. Some of the user migration computing device 120 may move out of the enterprise network 102.

At step 304, the state change handler 124 registers with operating system (OS) for notification of change in network condition. It also registers for operational state of the user migration computing device 120. Once the user migration computing device 120 moves out/in of the enterprise network 102, state change handler 124 receives notification from the OS and it initiates Network Detector 126 to check for presence of the enterprise network 102.

At step 306, network detector 126 selects the domain name from the configured domain lists. Below are steps for domain name selection Domain name selection priority is given to first fully qualified domain name (FQDN) present in the domain list.

At step 308, once domain name is selected, the user migration computing device 120 selects the first configured DNS server in the configuration, generate and send DNS query to the DNS server 106.

At step 310, check whether expected DNS response is received.

If expected DNS response is received, it is determined that the user migration computing device 120 is inside the enterprise network 102 (step 312).

At step 314, check for the expected DNS response from rest of configured DNS servers 106.

At step 316, it is determined whether expected DNS response is received.

If the expected DNS response is received, it is determined that the user migration computing device 120 is within the enterprise network 102 (step 318).

If the expected DNS response is not received from the rest of the configured DNS servers, it is determined that the user migration computing device 120 is outside the enterprise network 102 (step 320).

The present invention as described in detail above offers several advantages. Enterprise network is identified based on DNS server reachability No manual interaction required to differentiate enterprise and non-enterprise network Network identification is performed during operational state change of user device. Furthermore, there is zero touch initiation to check for the enterprise network 102.

In accordance with the principles of the present invention, there is no secure remote connection adapter. Secure remote connection is required only during system is in non-enterprise network. Adapter is only created in non-enterprise network and it will be deleted once system detects enterprise network. Current implementation detects enterprise or non-enterprise network based on reachability of configured enterprise DNS server. Detection of enterprise network is triggered whenever there is a change in system IP address. Seamless detection of enterprise or non-enterprise network happens whenever there is change in IP address, which helps in creating and deletion of secure remote connection. Proper detection of enterprise network avoids creation of secure remote connection within enterprise network.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
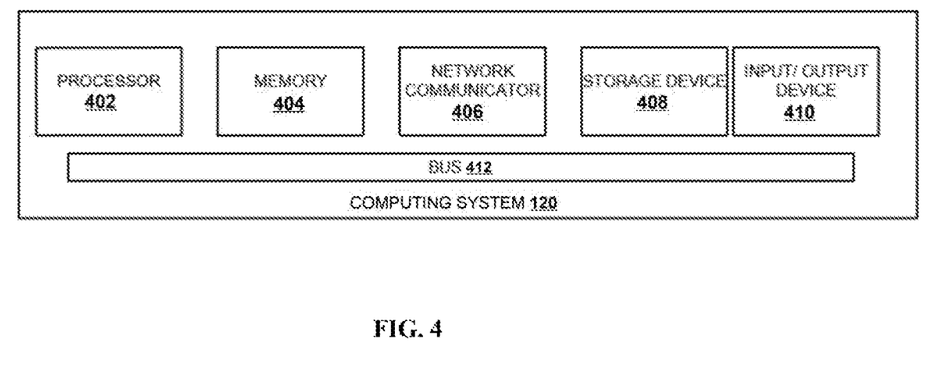
FIG. 4 is a block diagram of an exemplary computer system, according to one embodiment.

FIG. 4 is a block diagram further illustrating the user migration computing device 120 consistent with implementations of the current subject matter. As shown in FIG. 4, the user migration computing device 120 can include a processor 402, a memory 404, network communicator 406, a storage device 408, and input/output devices 410. The processor 402, the memory 404, network communicator 406, the storage device 408, and the input/output device 410 can be interconnected via a system bus 412. The processor 402 is capable of processing instructions for execution within the user migration computing device 120. Such executed instructions can implement one or more components of, for example, application A. In some example embodiments, the processor 402 can be a single-threaded processor. Alternately, the processor 402 can be a multi-threaded processor. The processor 402 is capable of processing instructions stored in the memory 404 and/or on the storage device 408 to display graphical information for a user interface provided via the input/output device 410.

The memory 404 is a computer readable medium such as volatile or non-volatile that stores information within the computing system 400. The memory 404 can store instructions and/or other data associated with the processes disclosed herein. The storage device 408 is capable of providing persistent storage for the computing system 400. The storage device 408 can be a hard disk device, an optical disk device, or a tape device, or other suitable persistent storage means. The input/output device 410 provides input/output operations for the computing system 400. In some example embodiments, the input/output device 410 includes a keyboard and/or pointing device. In various implementations, the input/output device 410 includes a display unit for displaying graphical user interfaces.

According to some example embodiments, the input/output device 410 can provide input/output operations for a network device. For example, the input/output device 410 can include Ethernet ports or other networking ports to communicate with one or more wired and/or wireless networks (e.g., a local area network (LAN), a wide area network (WAN), the Internet).

In some example embodiments, the computing system 400 can be used to execute various interactive computer software applications that can be used for organization, analysis and/or storage of data in various formats. Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. Upon activation within the applications, the functionalities can be used to generate the user interface provided via the input/output device 410. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitory, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer-implemented method for detecting migration of a user computing device from an enterprise network to a non-enterprise network, said method comprising the following computer-implemented steps:

configuring a computer-implemented, event-driven network detector installed within said user computing device to identify a first fully qualified domain name (FQDN) among a plurality of enterprise domains located within said enterprise network and pre-configured to communicate with said user computing device, and triggering said network detector to transmit a DNS query to a first DNS server located within said enterprise network and identifiable based on said first fully qualified domain name (FQDN), to determine reachability of said user computing device to said first DNS server;

determining, by said network detector, after elapse of a predetermined time period, if said first DNS server identified based on said first fully qualified domain name responded to said DNS query;

in an event said DNS query transmitted to said first DNS server is timed out, determining said FQDN and said first DNS server to be out-of-reach for said user computing device;

in an event said first FQDN is not available among said plurality of enterprise domains, configuring said network detector to select a first wildcard domain name from among said plurality of enterprise domains, remove a wildcard embedded within said first wildcard domain name and incorporate only a postfix entry of said first wild card domain name into said DNS query, and redirect said DNS query to at least a second DNS server located within said enterprise network and identifiable based on said wild card domain name, to determine reachability of said user computing device to said second DNS server;

determining, by said network detector, after elapse of said predetermined time period, if said second DNS server identified based on said first wild card domain name responded to redirected DNS query;

in an event said redirected DNS query is timed out, determining said second DNS server to be out-of-reach for said user computing device;

determining said user computing device to have migrated from said enterprise network to said non-enterprise network, only when one of said first DNS sever and said second DNS server is determined to be out-of-reach for said user computing device, subsequent to determining one of said DNS query and said redirected DNS query as being timed out;

determining, by said network detector, if a response provided by one of said first DNS server and said second DNS server in respect of one of said DNS query and said redirected DNS query respectively is in line with a predefined value;

responsive to ascertaining that said response is in line with said predefined value, determining, by said network detector, that said user computing device is located within said enterprise network.

2. The method as claimed in claim 1, wherein the step of determining, by said network detector, that said user computing device has migrated from said enterprise network to said non-enterprise network, further includes the step of configuring said network detector to initiate a virtual private network (VPN) connection between said user computing device, said non-enterprise network, and said enterprise network.

3. The method as claimed in claim 1, wherein the step of determining, by said network detector, if said response provided by one of said first DNS server and said second DNS server in respect of said DNS query and said redirected DNS query respectively is in line with said predefined value, further includes the step of determining, by said network detector, if said response incorporates an Internet protocol (IP) address pre-assigned to one of said first fully qualified domain name and said wild card domain name.

4. The method as claimed in claim 1, wherein the step of configuring said computer-implemented, event-driven network detector installed within said user computing device, further includes the step of configuring said network detector to be responsive to events selected from a group consisting of rebooting of said user computing device and shifting between operational modes of said user computing device.

5. The method as claimed in claim 1, wherein the step of determining, by said network detector, that said user computing device is located within said enterprise network, further includes the step of configuring said plurality of enterprise domains and one of said first DNS server and second DNS server to communicate with said user computing device via said enterprise network.

6. A computer implemented system for detecting migration of a user computing device from an enterprise network to a non-enterprise network, said system comprising:
a processor;
a memory module communicably coupled to said processor, said memory module storing computer program code, wherein said memory module and computer program code stored therein are configured, with the processor to:
configure a computer-implemented, event-driven network detector installed within said user computing device to identify a first fully qualified domain name (FQDN) among a plurality of enterprise domains located within said enterprise network and pre-configured to communicate with said user computing device, and further trigger said network detector to transmit a DNS query to a first DNS server located within said enterprise network and identifiable based on said first fully qualified domain name (FQDN), to determine reachability of said user computing device to said first DNS server;
trigger said network detector to determine, after elapse of a predetermined time period, if said first DNS server identified based on said first fully qualified domain name responded to said DNS query;
in an event said DNS query transmitted to said first DNS server is timed out, determine said FQDN and said first DNS server to be out-of-reach for said user computing device, and configure said network detector to select a first wild card domain name from among said plurality of enterprise domains, remove a wildcard embedded within said first wildcard domain name and incorporate only a postfix entry of said first wild card domain name into said DNS query, and redirect said DNS query to at least a second DNS server located within said enterprise network and identifiable based on said wild card domain name, to determine reachability of said user computing device to said second DNS server;
trigger said network detector to determine, after elapse of said predetermined time period, if said second DNS server identified based on said first wild card domain name responded to redirected DNS query;
in an event said redirected DNS query is timed out, determine said second DNS server to be out-of-reach for said user computing device;
determine said user computing device to have migrated from said enterprise network to said non-enterprise network, only when one of said first DNS sever and said second DNS server is determined to be out-of-reach for said user computing device;
trigger said network detector to determine if a response provided by one of said first DNS server and said second DNS server in respect of one of said DNS query and said redirected DNS query respectively is in line with a predefined value;
responsive to ascertaining that said response is in line with said predefined value, trigger said network detector to determine that said user computing device is located within said enterprise network.

7. The system as claimed in claim 6, wherein said processor configures said network detector to initiate a virtual private network connection between said user computing device, said non-enterprise network, and said enterprise network, in an event said user computing device is determined to have migrated from said enterprise network to said non-enterprise network.

8. The system as claimed in claim 6, wherein said processor triggers said network detector to determine if said response incorporates an internet protocol (IP) address pre-assigned to one of said first fully qualified domain name and said wild card domain name.

9. The system as claimed in claim 6, wherein said processor configures said network detector to be responsive to events selected from a group consisting of rebooting of said user computing device and shifting between operational modes of said user computing device.

10. The system as claimed in claim 6, wherein said processor triggers said network detector to configure said plurality of enterprise domains and one of said first DNS server and second DNS server to communicate with said user computing device via said enterprise network, only in an event said network handler determines said user computing device as being located within said enterprise network.

11. A non-transitory computer readable storage medium having computer-executable instructions stored thereon, said computer-executable instructions, when executed by a processor, cause said processor to:
configure a computer-implemented, event-driven network detector installed within said user computing device to identify a first fully qualified domain name (FQDN) among a plurality of enterprise domains located within s-gel an enterprise network and pre-configured to communicate with said user computing device, and further trigger said network detector to transmit a DNS query to a first DNS server located within said enterprise network and identifiable based on said first fully qualified domain name (FQDN), to determine reachability of said user computing device to said first DNS server;
trigger said network detector to determine, after elapse of a predetermined time period, if said first DNS server identified based on said first fully qualified domain name responded to said DNS query;
in an event said DNS query transmitted to said first DNS server is timed out, determine said FQDN and said first DNS server to be out-of-reach for said user computing device, and configure said network detector to select a first wild card domain name from among said plurality of enterprise domains, remove a wildcard embedded within said first wildcard domain name and incorporate only a postfix entry of said first wild card domain name into said DNS query, and redirect said DNS query to at least a second DNS server located within said enterprise network and identifiable based on said wild card domain name, to determine reachability of said user computing device to said second DNS server;

trigger said network detector to determine, after elapse of said predetermined time period, if said second DNS server identified based on said first wild card domain name responded to redirected DNS query;

in an event said redirected DNS query is timed out, determine said second DNS server to be out-of-reach for said user computing device;

determine said user computing device to have migrated from said enterprise network to a non-enterprise network, only when one of said first DNS sever and said second DNS server is determined to be out-of-reach for said user computing device;

trigger said network detector to determine if a response provided by one of said first DNS server and said second DNS server in respect of one of said DNS query and said redirected DNS query respectively is in line with a predefined value;

responsive to ascertaining that said response is in line with said predefined value, trigger said network detector to determine that said user computing device is located within said enterprise network.

12. The computer-executable instructions as claimed in claim 11, wherein said computer-executable instructions further cause said processor to:

configure said network detector to initiate a virtual private network connection between said user computing device, said non-enterprise network, and said enterprise network, in an event said user computing device is determined to have migrated from said enterprise network to said non-enterprise network;

trigger said network detector to determine if said response incorporates an internet protocol (IP) address pre-assigned to one of said first fully qualified domain name and said wild card domain name;

configure said network detector to be responsive to events selected from a group consisting of rebooting of said user computing device and shifting between operational modes of said user computing device.

* * * * *